United States Patent
Freed et al.

(10) Patent No.: US 11,216,739 B2
(45) Date of Patent: Jan. 4, 2022

(54) SYSTEM AND METHOD FOR AUTOMATED ANALYSIS OF GROUND TRUTH USING CONFIDENCE MODEL TO PRIORITIZE CORRECTION OPTIONS

(71) Applicant: International Business Machines Corporation, Armonk, NY (US)

(72) Inventors: Andrew R. Freed, Cary, NC (US); Kyle G. Christianson, Rochester, MN (US); Christopher Phipps, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 16/044,643

(22) Filed: Jul. 25, 2018

(65) Prior Publication Data

US 2020/0034732 A1 Jan. 30, 2020

(51) Int. Cl.
  *G06N 5/02* (2006.01)
  *G06N 5/04* (2006.01)
  *G06N 3/00* (2006.01)
  *G06N 20/00* (2019.01)

(52) U.S. Cl.
  CPC ............. *G06N 5/048* (2013.01); *G06N 3/006* (2013.01); *G06N 5/02* (2013.01); *G06N 20/00* (2019.01)

(58) Field of Classification Search
  CPC .................................. G06N 5/02; G06N 5/048
  See application file for complete search history.

(56) References Cited

U.S. PATENT DOCUMENTS

| | | | |
|---|---|---|---|
| 9,836,488 B2 | 12/2017 | Marrelli et al. | |
| 9,842,096 B2 | 12/2017 | Beller et al. | |
| 2002/0129342 A1 | 9/2002 | Kil et al. | |
| 2013/0117203 A1* | 5/2013 | Malka | G06N 5/04 706/12 |
| 2013/0275393 A1* | 10/2013 | Kaldas | G06F 16/215 707/692 |
| 2015/0269139 A1 | 9/2015 | McAteer et al. | |
| 2017/0169354 A1 | 6/2017 | Diamanti et al. | |
| 2017/0169355 A1 | 6/2017 | Boyer et al. | |
| 2017/0192976 A1 | 7/2017 | Bhatia et al. | |

(Continued)

OTHER PUBLICATIONS

Benjamin Timmermans et al., Crowdsourcing Ground Truth for Question Answering Using CrowdTruth, WebSci 2015 Proceedings of the ACM Web Science Conference, Article No. 61, Oxford, United Kingdom.
Oren Sar Shalom et al., Data Quality Matters in Recommender Systems, ReeSys 2015 Proceedings of the 9th ACM Conference on Recommender Systems, pp. 257-260.

(Continued)

*Primary Examiner* — Hal Schnee
(74) *Attorney, Agent, or Firm* — Terrile, Cannatti & Chambers, LLP; Stephen A. Terrile

(57) ABSTRACT

A method, system and computer-usable medium are disclosed for automated analysis of ground truth using confidence model to prioritize correction options. In certain embodiments, the ground truth data is analyzed to identify review-candidates. A confidence level may be assigned to each of the identified review-candidates and the review-candidates are prioritized, at least in part, using the assigned confidence levels. The review-candidates are electronically presented in prioritized order to solicit verification or correction feedback for updating the ground truth data.

15 Claims, 6 Drawing Sheets

(56) References Cited

U.S. PATENT DOCUMENTS

2018/0011837 A1 1/2018 Beller et al.
2018/0300649 A1* 10/2018 Lee ..................... G06N 5/022

OTHER PUBLICATIONS

Anonymous, ip.com, Effort Estimation for Data Cleansing Jobs, IPCOMM000195842D, May 19, 2010.

Rob High, The Era of Cognitive Systems: An Inside Look at IBM Watson and How it Works, IBM Redbooks, 2012.

Michael Yuan et al., Watson and Healthcare, IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber-6177717.

IBM, Watson Knowledge Studio, Building the ground truth, updated Jun. 13, 2018 https://console.bluemix.net/docs/services/watson-knowledge-studio/build-groundtruth.html#build-groundtruth.

Vijayshankar Raman et al., Potter's Wheel: An Interactive Data Cleaning System, Proceedings of the 27th VLDB Conference, Rome, Italy, 2001, http://www.vldb.org/conf/2001/P381.pdf.

Surajit Chaudhuri et al., Robust and Efficient Fuzzy Match for Online Data Cleaning, Abstract, Proceedings of the 2003 ACM SIGMOD International Conference on Management of Data, San Diego, California, Jun. 9-12, 2003, http://dl.acm.org/citation.cfm?id=872796.

Helena Galhardas et al., AJAX: an extensible data cleaning tool, Abstract, Proceedings of the 2000 SIGMOD International Conference on Management of Data, Dallas, Texas, May 15-18, 2000, http://dl.acm.org/citation.cfm?id=336568.

Yongxin Tong et al., CrowdCleaner: Data cleaning for multi-version data on the web via crowdsourcing, Abstract, 2014 IEEE 30th International Conference on Data Engineering, Mar. 31-Apr. 4, 2014, http://ieeexplore.ieee.org/abstract/document/6816736/.

Xu Chu et al., KATARA: A Data Cleaning System Powered by Knowledge Bases and Crowdsourcing, Proceedings of the 2015 ACM SIGMOD International Conference on Management of Data, Melbourne, Victoria, Australia, May 31-Jun. 4, 2015, https://cs.uwaterloo.ca/~ilyas/papers/ChuSIGMOD2015.pdf.

* cited by examiner

| Quick Fix Suggestion | Reasons |
|---|---|
| 1. Merge attribute squareFootCost into costSquareFoot | • Conf 95%<br>• Does not conflict with other attributes<br>• Edit distance = 1 |
| 2. Modify entry value from "$12.80 (I think)" to "$12.80" | • Conf: 94%<br>• All other values pass a NumberFormatter |
| 3. Set Data Type of costSquareFoot to currency | • Conf 90%<br>• All but one lead with dollar sign<br>• All but two pass a CurrencyFormatter |
| 4. Set Acceptance Criteria of costSquareFoot to +/- $0.01 | • Conf 82%<br>• Observed conflict over two entries<br>• No value range defined yet |
| 5. Modify entry value from "$905" to "$9.05" | • Conf 60%<br>• Small edit distance but large value change |
| 6. Set Value Range of costSquareFoot to $9.00, $13.00 | • Conf 40%<br>• Only 5 values observed<br>• No attribute type defined yet |

Figure 6

SYSTEM AND METHOD FOR AUTOMATED ANALYSIS OF GROUND TRUTH USING CONFIDENCE MODEL TO PRIORITIZE CORRECTION OPTIONS

BACKGROUND OF THE INVENTION

Field of the Invention

The present invention relates in general to the field of computers and similar technologies, and in particular to software utilized in this field. Still more particularly, it relates to a method, system and computer-usable medium for providing automatic analysis of ground truth.

Description of the Related Art

In the field of artificially intelligent computer systems capable of answering questions posed in natural language, cognitive question answering systems (such as the IBM Watson™ artificially intelligent computer system or and other natural language question answering systems) process questions posed in natural language to determine answers and associated confidence scores based on knowledge acquired by the question answering (QA) system. To train such QA systems, a subject matter expert (SME) presents ground truth data in the form of question-answer-passage (QAP) triplets or answer keys to a machine learning algorithm. Typically derived from fact statements submissions to the QA system, such ground truth data is expensive and difficult to collect. Conventional approaches for developing ground truth will use an annotator component to identify entities and entity relationships according to a statistical model that is based on ground truth. Such annotator components are created by training a machine learning annotator with training data and then validating the annotator by evaluating training data with test data and blind data, but such approaches are time-consuming, error-prone, and labor-intensive. Even when the process is expedited by using dictionary and rule-based annotators to pre-annotate the ground truth, SMEs must still review and correct the entity/relation classification instances in the machine-annotated ground truth. With hundreds or thousands of entity/relation instances to review in the machine-annotated ground truth, the accuracy of the SME's validation work can be impaired due to fatigue or sloppiness as the SME skims through too quickly to accurately complete the task. As a result, the existing solutions for efficiently generating and validating ground truth data are extremely difficult at a practical level.

Cognitive projects involve cooperation between cognitive developers and the SMEs. Developers are experts in developing cognitive projects but may not know much about the project's domain. On the other hand, SMEs are knowledge experts in the project's domain, but they are not necessarily technologically knowledgeable about cognitive system designed. These two roles, however must work together to bridge the knowledge gap and create a useful product.

One major obstacle encountered in cognitive project development is the gathering of quality ground truth values from SME's knowledge of the project domain. Ground truth comes in many forms and differs with every project. For example, a project may need to extract borrower names from loan forms, in which case we require SMEs to provide us with the correct form of each borrow name for a set of test documents. If a cognitive system extracts a name that differs from the string provided by the SMEs provided, the cognitive system might score the different string as a miss. Consequently, minor differences in strings can degrade the performance of the cognitive system.

Developers depend on quality ground truth to measure cognitive performance of systems including NLP extraction and ML techniques. Gathering quality ground truth may be difficult because it is often a manual process and requires very detailed communication between the cognitive system developers and SMEs. The SMEs ultimately determine the ground truth values, but often don't have the time or patience to produce the detail required. Ground truth values are often misspelled or off by several units. Incorrect ground truth values can be detrimental to a cognitive system development project. Low-resource, crowdsourcing tools (MTurk, WKS) are helpful but not necessarily a good solution because any given crowdsourced ground truth may conflict with another given ground truth and still requires the SMEs' review. To complicate the situation further, some domain values allow for flexibility. For example, a person's name in the domain of academic papers, may or may not include the middle name or middle initial. However, in the domain of government documents, a person's name must include the full middle name.

SUMMARY OF THE INVENTION

A method, system and computer-usable medium are disclosed for automating the analysis of ground truth using a confidence model to prioritize correction options. In certain embodiments, the ground truth data is analyzed to identify review-candidates. A confidence level may be assigned to each of the identified review-candidates and the review-candidates are prioritized, at least in part, using the assigned confidence levels. The review-candidates are electronically presented in prioritized order to solicit verification or correction feedback for updating the ground truth data. In certain embodiments, the system generating suggested fixes for the review-candidates and groups identified review-candidates having the same suggested fixes. In some embodiments the grouped review-candidates are electronically presented in prioritized order along with the suggested fixes to solicit corrective feedback for updating the ground truth data using the suggested fixes. In certain embodiments, the review-candidates are prioritized based on an impact of changing the review-candidate in the ground truth data using one or more of the respective suggested fixes. In certain embodiments, the impact of changing the review-candidate in the ground truth data is based, at least in part, on the number of ground truth data entries that would be changed using respective suggested fixes.

In certain embodiments, review candidates are identified based on similarities between different attribute names, and a high confidence level is assigned to review-candidates having different attribute names within a predetermined edit distance. In certain embodiments, the predetermined edit distance is selected so that different attribute names having only slight differences are identified as review-candidates.

In certain embodiments, review-candidates are identified based on differences in data types found for a given attribute. In such embodiments, a high confidence level may be assigned to review-candidates having different data types for the given attribute.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 6 is an exemplary screen shot that may be presented showing ground truth data results using certain embodiments of the information processing system.

DETAILED DESCRIPTION

Figure 1:
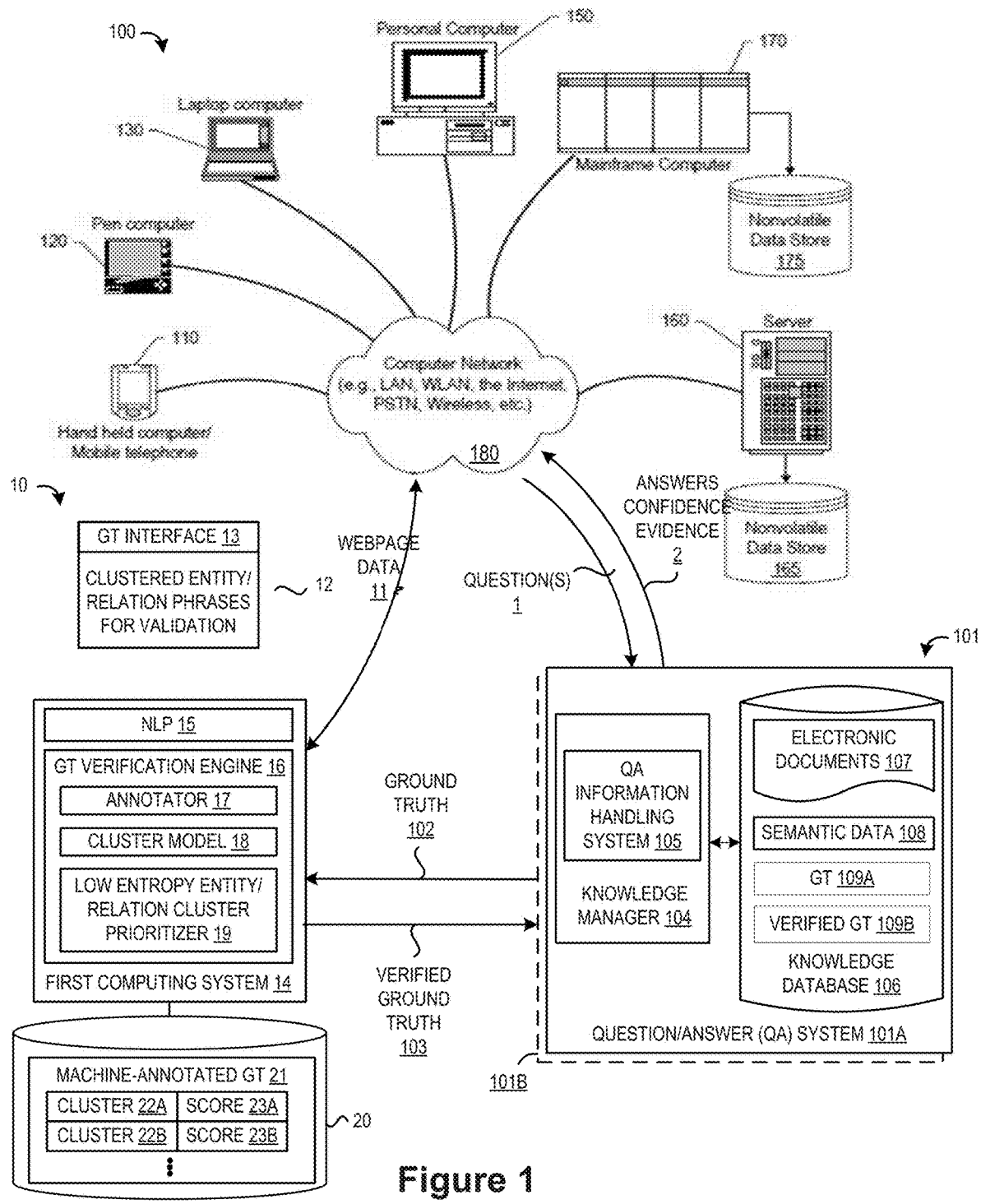
FIG. 1 depicts a schematic diagram of one illustrative embodiment of a question/answer (QA) system.

Various embodiments of the invention are directed to automated analysis of ground truth using an information processing system that, among other things, provides automated analysis of ground truth and bridges the gap between cognitive developers and SMEs. In certain embodiments, ground truth is provided from SMEs to a cognitive system developer. The ground truth is analyzed by the information processing system for review-candidates, which are then prioritized based on various criterion. In certain embodiments, the review candidates are presented in prioritized order to an SME to allow the SME to correct any errors in the ground truth. In certain embodiments, the information processing systems provides the SME with fixes for the review-candidates to update the ground truth and improve the information processing system's ability to more effectively execute its QA operations.

The present invention may be a system, a method, and/or a computer program product. In addition, selected aspects of the present invention may take the form of an entirely hardware embodiment, an entirely software embodiment (including firmware, resident software, microcode, etc.), or an embodiment combining software and/or hardware aspects that may all generally be referred to herein as a "circuit," "module" or "system." Furthermore, aspects of the present invention may take the form of computer program product embodied in a computer-readable storage medium or media having computer readable program instructions thereon for causing a processor to carry out aspects of the present invention. Thus embodied, the disclosed system, a method, and/or a computer program product is operative to improve the functionality and operation of a cognitive question answering (QA) systems by efficiently providing ground truth data for improved training and evaluation of cognitive QA systems.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, PHP Hypertext Processor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram 100 of one illustrative embodiment of a question/answer (QA) system 101 directly or indirectly connected to a first computing system 14 that uses a ground truth verification engine 16 to verify or correct machine-annotated ground truth data 102 (e.g., entity and relationship instances in training sets) for training and evaluation of the QA system 101. The QA system 101 may include one or more QA system pipelines 101A, 101B, each of which includes a knowledge manager computing device 104 (comprising one or more processors and one or more memories, and potentially any other computing device elements generally known in the art including busses, storage devices, communication interfaces, and the like) for processing questions received over the network 180 from one or more users at computing devices (e.g., 110, 120, 130). Over the network 180, the computing devices communicate with each other and with other devices or components via one or more wired and/or wireless data communication links, where each communication link may comprise one or more of wires, routers, switches, transmitters, receivers, or the like. In this networked arrangement, the QA system 101 and network 180 may enable question/answer (QA) generation functionality for one or more content users. Other embodiments of QA system 101 may be used with components, systems, sub-systems, and/or devices other than those that are depicted herein.

In the QA system 101, the knowledge manager 104 may be configured to receive inputs from various sources. For example, knowledge manager 104 may receive input from the network 180, one or more knowledge bases or corpora 106 of electronic documents 107, semantic data 108, or other data, content users, and other possible sources of input. In selected embodiments, the knowledge base 106 may include structured, semi-structured, and/or unstructured content in a plurality of documents that are contained in one or more large knowledge databases or corpora. The various computing devices (e.g., 110, 120, 130) on the network 180 may include access points for content creators and content users. Some of the computing devices may include devices for a database storing the corpus of data as the body of information used by the knowledge manager 104 to generate answers to cases. The network 180 may include local network connections and remote connections in various embodiments, such that knowledge manager 104 may operate in environments of any size, including local networks (e.g., LAN) and global networks (e.g., the Internet). Additionally, knowledge manager 104 serves as a front-end system that can make available a variety of knowledge extracted from or represented in documents, network-accessible sources and/or structured data sources. In this manner, some processes populate the knowledge manager which may include input interfaces to receive knowledge requests and respond accordingly.

In one embodiment, the content creator creates content in an electronic document 107 for use as part of a corpora 106 of data with knowledge manager 104. The corpora 106 may include any structured and unstructured documents, including but not limited to any file, text, article, or source of data (e.g., scholarly articles, dictionary definitions, encyclopedia references, and the like) for use by the knowledge manager 104. Content users may access the knowledge manager 104 via a connection or an Internet connection to the network 180, and may input questions to the knowledge manager 104 that may be answered by the content in the corpus of data.

As further described below, when a process evaluates a given section of a document for semantic content, the process can use a variety of conventions to query it from the knowledge manager. One convention is to send a well-formed question 1. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 1 (e.g., natural language questions, etc.) to the knowledge manager 104. Knowledge manager 104 may interpret the question and provide a response to the content user containing one or more answers 2 to question 1. In some embodiments, the knowledge manager 104 may provide a response to users in a ranked list of answers 2.

In some illustrative embodiments, QA system 101 may be the IBM Watson™ QA system available from International Business Machines Corporation of Armonk, N.Y., which is augmented with the mechanisms of the illustrative embodiments described hereafter. The IBM Watson™ knowledge manager system may receive an input question 1 which it then parses to extract the major features of the question, that in turn are then used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 1 may be processed by the IBM Watson™ QA system 101 which performs deep analysis on the language of the input question 1 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 101 then generates an output response or answer 2 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In addition to providing answers to questions, QA system 101 is connected to at least a first computing system 14 having a connected display 12 and memory or database storage 20 for retrieving ground truth data 102 which is processed with a classifier or annotator 17 to generate machine-annotated ground truth 21 having clusters 22 of training sets and/or validation sets, each of which has a corresponding validation score 23 for use in prioritizing SME verification and correction to generate verified ground truth 103 which may be stored in the knowledge database 106 as verified ground truth (GT) 109B for use in training the QA system 101. Though shown as being directly connected to the QA system 101, the first computing system 14 may be indirectly connected to the QA system 101 via the computer network 180. Alternatively, the functionality described herein with reference to the first computing system 14 may be embodied in or integrated with the QA system 101.

In various embodiments, the QA system 101 is implemented to receive a variety of data from various computing devices (e.g., 110, 120, 130, 140, 150, 160, 170) and/or other data sources, which in turn is used to perform QA operations described in greater detail herein. In certain embodiments, the QA system 101 may receive a first set of information from a first computing device (e.g., laptop computer 130) which is used to perform QA processing operations resulting in the generation of a second set of data, which in turn is provided to a second computing device (e.g., server 160). In response, the second computing device may process the second set of data to generate a third set of data, which is then provided back to the QA system 101. In turn, the QA system 101 may perform additional QA processing operations on the third set of data to generate a fourth set of data, which is then provided to the first computing device (e.g., 130). In various embodiments the exchange of data between various computing devices (e.g., 101, 110, 120, 130, 140, 150, 160, 170) results in more efficient processing of data as each of the computing devices can be optimized for the types of data it processes. Likewise, the most appropriate data for a particular purpose can be sourced from the most suitable computing device (e.g., 110, 120, 130, 140, 150, 160, 170) or data source, thereby increasing processing efficiency. Skilled practitioners of the art will realize that many such embodiments are possible and that the foregoing is not intended to limit the spirit, scope or intent of the invention.

To train the QA system 101, the first computing system 14 may be configured to collect, generate, and store machine-annotated ground truth data 21 (e.g., as training sets and/or validation sets) having annotation instances which are clustered by feature similarity into clusters 22A, 22B for storage in the memory/database storage 20, alone or in combination with associated verification scores for each cluster 23A, 23B. To efficiently collect the machine-annotated ground truth data 21, the first computing system 14 may be configured to access and retrieve ground truth data 109A that is stored at the knowledge database 106. In addition or in the alternative, the first computing system 14 may be configured to access one or more websites using search engine functionality or other network navigation tool to access one or more remote websites over the network 180 in order to locate information (e.g., an answer to a question). In selected embodiments, the search engine functionality or other network navigation tool may be embodied as part of a ground truth verification engine 16 which exchanges webpage data 11 using any desired Internet transfer protocols for accessing and retrieving webpage data, such as HTTP or the like. At an accessed website, the user may identify ground truth data that should be collected for addition to a specified corpus, such as an answer to a pending question, or a document (or document link) that should be added to the corpus.

Once retrieved, portions of the ground truth 102 may be identified and processed by the annotator 17 to generate machine-annotated ground truth 21. To this end, the ground truth verification engine 16 may be configured with a machine annotator 17, such as dictionary/rules-based annotator or a machine-learned annotator from a small human-curated training set, which uses one or more knowledge resources to classify the document text passages from the retrieved ground truth to identify entity and relationship annotations in one or more training sets and validation sets. Once the machine-annotated training and validation sets are available (or retrieved from storage 20), they may be scanned to generate a vector representation for each machine-annotated training and validation sets using any suitable technique, such as using an extended version of Word2Vec, Doc2Vec, or similar tools, to convert phrases to vectors, and applying a cluster modeling program 18 to cluster the vectors from the training and validation sets. To this end, the ground truth verification engine 16 may be configured with a suitable neural network model (not shown) to generate vector representations of the phrases in the machine-annotated ground truth 21, and may also be configured with a cluster modeling program 18 to output clusters as groups of phrases with similar meanings, effectively placing words and phrases with similar meanings close to each other (e.g., in a Euclidean space).

To identify portions of the machine-annotated ground truth 21 that would most benefit from human verification, the ground truth verification engine 16 is configured with a cluster prioritizer 19 which prioritizes clusters of phrases containing machine-annotated entities/relationships for the purposes of batch verification from a human SME. To exploit the efficiency from verifying larger clusters which contribute more to the training set size, the prioritizer 19 may prioritize clusters based on cluster size so that training examples in large clusters are given priority for SME review. In addition or in the alternative, the prioritizer 19 may prioritize clusters based on a confidence measure which the statistical probability that the machine-annotated training examples in the cluster are "true positives" based on the feature set of each annotation cluster. In addition or in the alternative, the prioritizer 19 may prioritize clusters based on a consistency measure (e.g., IAA score) for the reviewing SME as compared to other SMEs reviewing entity/relationships in each annotation cluster. In addition or in the alternative, the prioritizer 19 may prioritize clusters based on a cross-validation R/P/F1 metric for the entity/relationship instances in a given annotation cluster.

To visually present the clusters for SME review, the ground truth verification engine 16 is configured to display a ground truth (GT) interface 13 on the connected display 12. At the GT interface 13, the user at the first computing system 14 can manipulate a cursor or otherwise interact with a displayed listing of clustered entity/relation phrases that are prioritized and flagged for SME validation to verify or correct prioritized training examples in clusters needing human verification. In selected embodiments, the displayed cluster of entity/relation phrases is selected on the basis of a verification score for the cluster, with each constituent entity/relation phrase from the cluster being displayed for SME review. Verification or correction information assembled in the ground truth interface window 13 based on input from the domain expert or system knowledge expert may be used to store and/or send verified ground truth data 103 for storage in the knowledge database 106 as stored ground truth data 109B for use in training a final classifier or annotator.

Types of information processing systems that can utilize QA system 101 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information processing systems include pen, or tablet, computer 120, laptop, or notebook, computer 130, personal computer system 150, server 160, and mainframe computer 170. As shown, the various information processing systems can be networked together using computer network 180. Types of computer network 180 that can be used to interconnect the various information processing systems include Personal Area Networks (PANs), Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. Some of the information processing systems may use separate nonvolatile data stores. For example, server 160 utilizes nonvolatile data store 165, and mainframe computer 170 utilizes nonvolatile data store 175. The nonvolatile data store can be a component that is external to the various information processing systems or can be internal to one of the information processing systems. An illustrative example of an information processing system showing an exemplary processor and various components commonly accessed by the processor is shown in FIG. 2.

Figure 2:
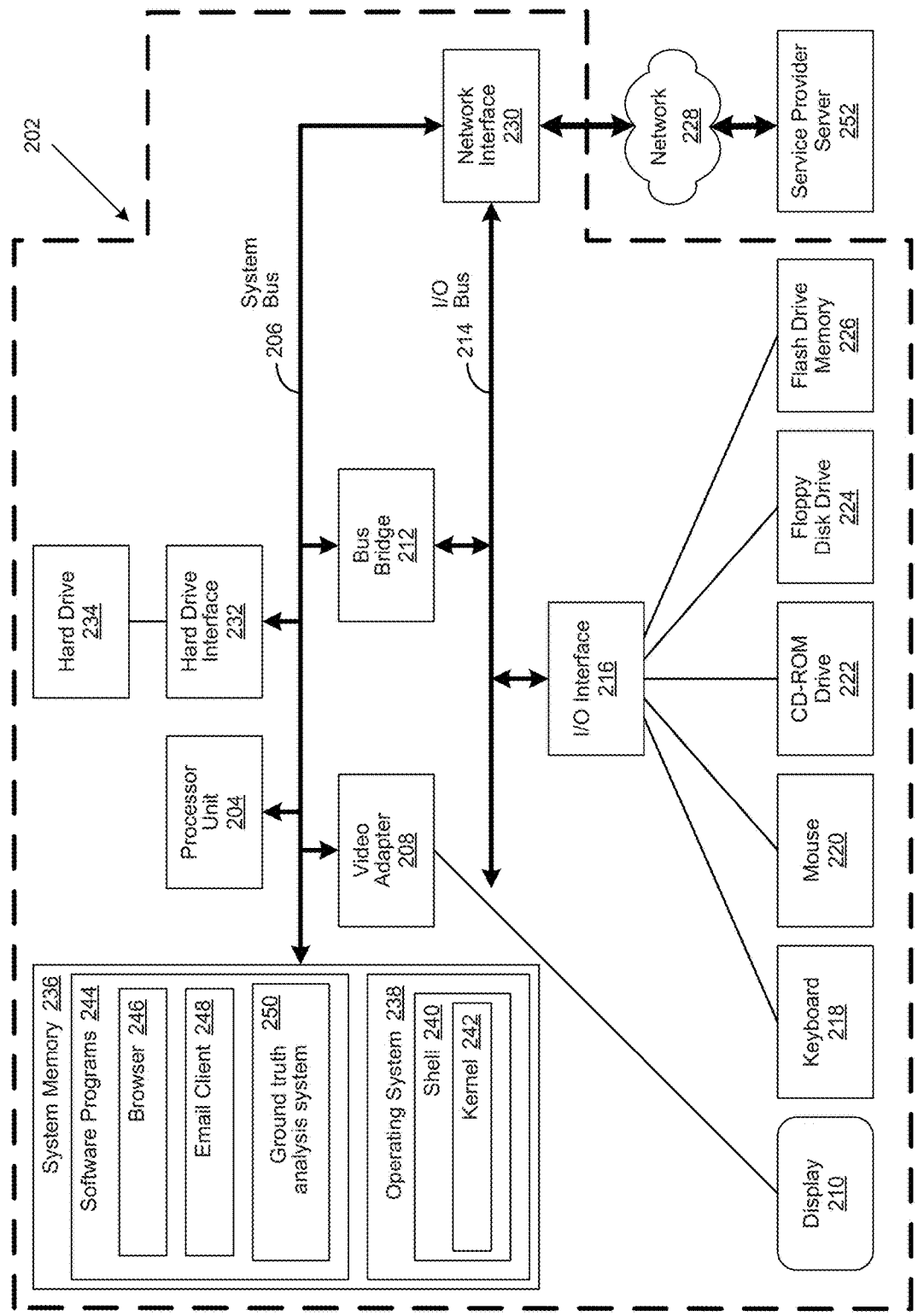
FIG. 2 depicts a simplified example of one embodiment of an information processing system.

FIG. 2 illustrates an information handling system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, the information processing system 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information handling system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include a system for providing automatic analysis of ground truth 250. In these and other embodiments, the system for providing automatic analysis of ground truth 250 includes code for implementing the processes described hereinbelow. In one embodiment, the information handling system 202 is able to download the system for providing automatic analysis of ground truth 250 from a service provider server 252.

The hardware elements depicted in the information handling system 202 are not intended to be exhaustive, but rather are representative to highlight components used by the present invention. For instance, the information handling system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
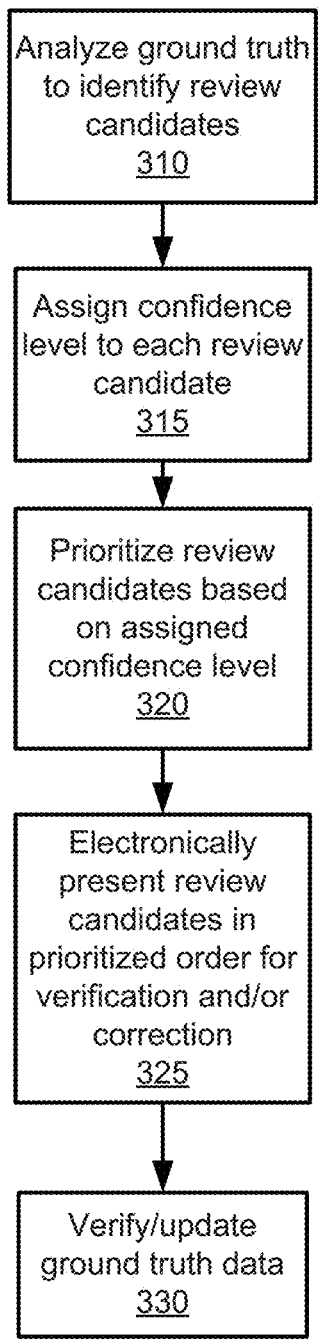
FIG. 3 is a flowchart depicting operations that may be executed by certain embodiments of an information processing system.

FIG. 3 is a flowchart depicting operations that may be executed by certain embodiments of the information processing system. At operation 310, the information processing system analyzes the ground truth data provided by, for example, one or more SMEs, to identify review candidates. In certain embodiments, the analysis includes checking for differences in attribute names to identify review candidates. In this regard, review candidates may be identified by comparing attribute names with one another using statistical analysis to identify differences between attribute names based on edit distance. Based on this analysis, the information processing system attempts to determine the possibilities that two or more attribute names actually correspond to the same attribute name. In certain embodiments, the information processing system analyzes the data types of attribute values to determine whether one or more attribute values should be formally restricted to a given data type. In certain embodiments, the information processing system analyzes the attribute values to check for outliers or other values indicative of an entry being a review candidate. Additionally, or in the alternative, the information processing system may execute other analyses at operation 310 to identify review candidates.

At operation 315, the information processing system assigns a confidence level to each review-candidate. In certain embodiments, string matching techniques are used for comparing attribute names and range/difference techniques are used for comparing numbers and dates. In certain embodiments, if the information processing system determines that there is a small difference between attribute names, then the system assigns a higher level of confidence that the attribute names are review candidates compared to attributes names having large differences. If the information processing system finds the same incorrect value multiple times, the information processing system assigns a high confidence level that the incorrect values are review candidates. In certain embodiments, the information processing system analyzes the ground truth data and flags outliers within the entry values as review candidates. If the information processing system finds such outliers, the information processing system may assign a high level of confidence that such outlying ground truth values are review candidates depending on the extent to which the attribute value is an outlier. In certain embodiments, the information processing system analyzes the attribute values and flags values that have differing data types. For example, if a majority of the ground truth values have a given data type while others have different data types, the information processing system may assign a high level of confidence that the values having the different data type are review candidates.

At operation 320, the information processing system prioritizes the review candidates based on the confidence level. In certain embodiments, each review candidate is prioritized solely based on its respective confidence level.

In certain embodiments, review candidates of the same type are grouped and prioritized based on the group to which the review candidates belong. For example, the group of review candidates having differences between attribute names may be prioritized at a higher priority than, for example, the group of review candidates associated with attribute values having different data types. In another example, the group of review candidates associated with outliers may be assigned a higher priority than the group of review candidates associated with attribute values having different data types. Within each group, each review candidate may be prioritized based on its respective confidence level.

In certain embodiments, the prioritization of the review candidate groups may be based on an average confidence level for review candidates in the respective group. In certain embodiments, the average confidence level for a particular group of review candidates may be determined using the confidence level of each respective review candidate within that group. In one example, if the average confidence level of the group of review candidates identified with attribute name differences is higher than the average confidence level of the group of review candidates identified as outliers, then the group of review candidates identified with attribute name differences may be assigned a higher priority than the group of review candidates identified as outliers. In certain embodiments, review candidates may be prioritized within respective review candidate groups based on assigned confidence levels.

Once the review candidates have been identified and prioritized, the information processing system electronically presents the review candidates in prioritized order at operation 325. In certain embodiments, the information processing system presents the review candidates as a file stored in persistent data storage, where the file may be accessed using a publicly available or proprietary software program capable of displaying the review candidates. In certain embodiments, the file may be in the form of a spreadsheet that is accessible by a corresponding program. In certain embodiments, the information processing system presents the review candidates on an electronic display. In certain embodiments, the information processing system is used to present the review candidates in a human readable form on a print medium.

The prioritized review candidates may be verified and/or corrected at operation 330 by, for example, an SME. In certain embodiments, the SME is allowed to electronically verify and/or correct the ground truth data and store that data for subsequent use in generating a ground truth model. Since review candidates in the ground truth data have already been prioritized for the SME, the SME may update the ground truth data without the tedious manual work associated with reviewing the ground truth data on an entry-by-entry basis. Once an SME has verified and/or corrected the review candidates, the resulting ground truth data may be updated and used to generate a more accurate ground truth data structure for executing QA operations. In certain embodiments, the operations shown in FIG. 3 may be re-run after the ground truth data has been updated to identify additional review-candidates and/or to verify that the updates to the ground truth data are correct.

Figure 4:
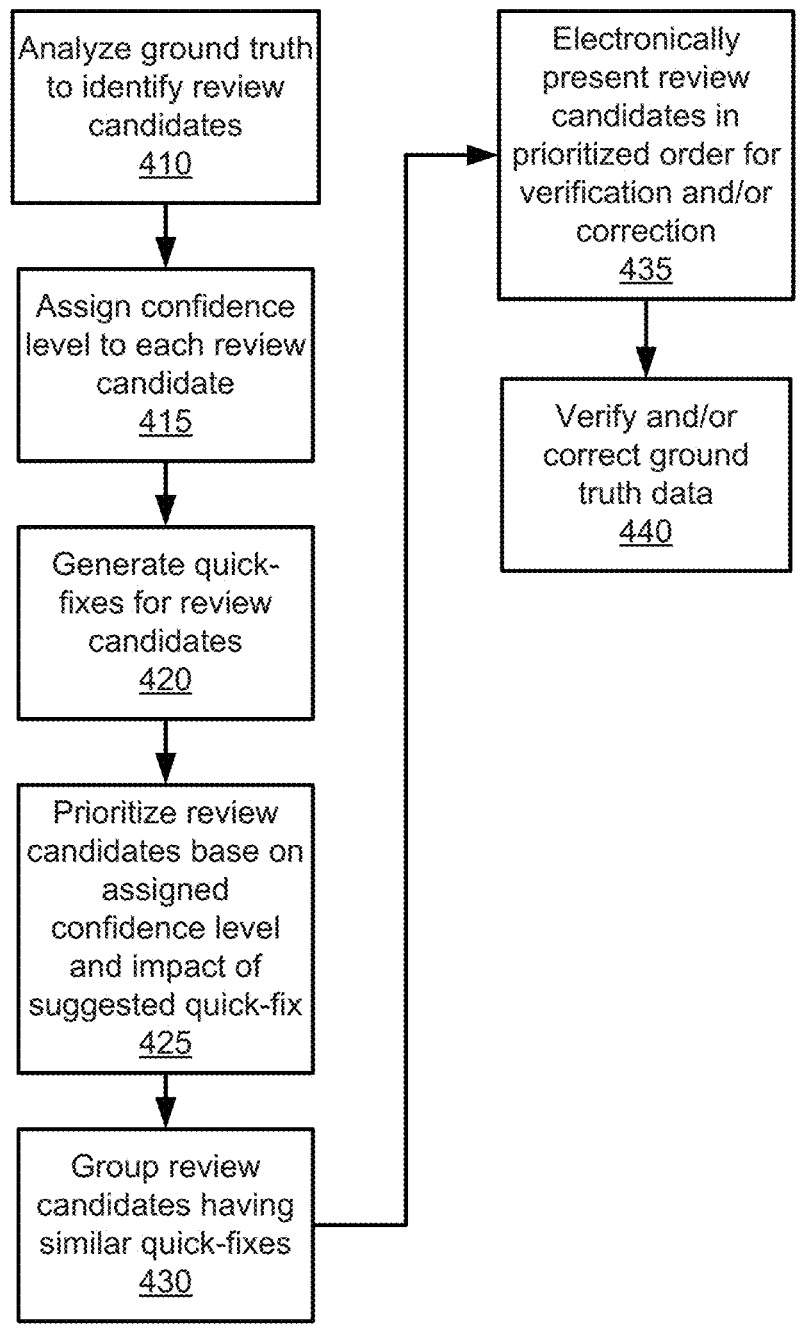
FIG. 4 is another flowchart depicting operations that may be executed by certain embodiments of an information processing system.

FIG. 4 is another flowchart depicting operations that may be executed by certain embodiments of the information processing system. At operation 410, the information processing system analyzes the ground truth data provided by, for example, one or more SMEs, to identify review candidates. In certain embodiments, the analysis includes checking for differences in attribute names to identify review candidates. In this regard, review candidates may be identified by comparing attribute names with one another using statistical analysis to identify differences in the attribute names based on edit distance. Based on this analysis, the information processing system attempts to determine the possibilities that two or more attribute names actually correspond to the same attribute name. In certain embodiments, the information processing system analyzes the data types of attribute values to determine whether one or more attribute values should be formally restricted to a given data type. In certain embodiments, the information processing system analyzes the attribute values to check for outliers or other values indicative of an entry being a review candidate. Additionally, or in the alternative, the information processing system may execute other analyses at operation 410 to identify review candidates.

At operation 415, the information processing system assigns a confidence level to each review candidate. In certain embodiments, string matching techniques are used for comparing attribute names and range/difference techniques are used for comparing numbers and dates. In certain embodiments, if the information processing system determines that there is a small difference between attribute names, then the system assigns a higher level of confidence that the attribute names are review candidates compared to attributes names having large differences. If the information processing system finds the same incorrect value multiple times, the information processing system assigns a high confidence level that the incorrect values are review candidates. In certain embodiments, the information processing system analyzes the ground truth data and flags outliers within the entry values as review candidates. If the information processing system finds such outliers, the information processing system may assign a high level of confidence that such outlying ground truth values are review candidates depending on the extent to which the attribute value is an outlier. In certain embodiments, the information processing system analyzes the attribute values and flags values that have differing data types. For example, if a majority of the ground truth values have a given data type while others have different data types, the information processing system may assign a high level of confidence that the values having the different data type are review candidates.

At operation 420, the information processing system generates fixes for review candidates. In certain embodiments, the information processing system may generate fixes to assign a particular data type for certain review candidates. In certain embodiments, the information processing system may generate fixes suggesting modification of attribute values having outlying values. In certain embodiments, the information processing system may generate fixes suggesting modifications of attribute names. Other fixes may be suggested based on the type of review candidate.

At operation 425, the information processing system prioritizes the review candidates based on the confidence level and the impact that the corresponding quick-fix has on the overall ground truth data. In determining the impact of the quick fix, certain embodiments may use the total number of entries affected by the suggested quick fix. In certain embodiments, the impact of the quick fix may be determined using the degree of change of the values necessary to implement the suggested quick-fix. Other exemplary embodiments may use other analyses to determine the impact of the quick-fix. The confidence levels and the impacts of the suggested fixes may be combined in a number of different manners in the prioritization operations of 425.

At operation 430, review candidates having the same and/or similar quick fixes are grouped together. At operation 435, review candidates having the same and/or similar quick fixes are presented in prioritized order for verification and/or correction by, for example, an SME. In certain embodiments, the SME is allowed to electronically verify and/or correct the ground truth data using the suggested fixes and store the verified and/or corrected data for subsequent use in generating a ground truth model. Since review candidates have already been identified along with respective suggested fixes, the SME may verify and/or correct the ground truth data without the corresponding tedious manual work associated with reviewing the ground truth data on an entry-by-entry basis. Once an SME has verified and/or corrected the review candidates, the resulting ground truth data may be updated and used to generate a more accurate ground truth data structure for executing QA operations. In certain embodiments, the operations shown in FIG. 4 may be re-run after the ground truth data has been updated to identify additional review-candidates and/or to verify that the updates to the ground truth data are correct.

Figure 5:
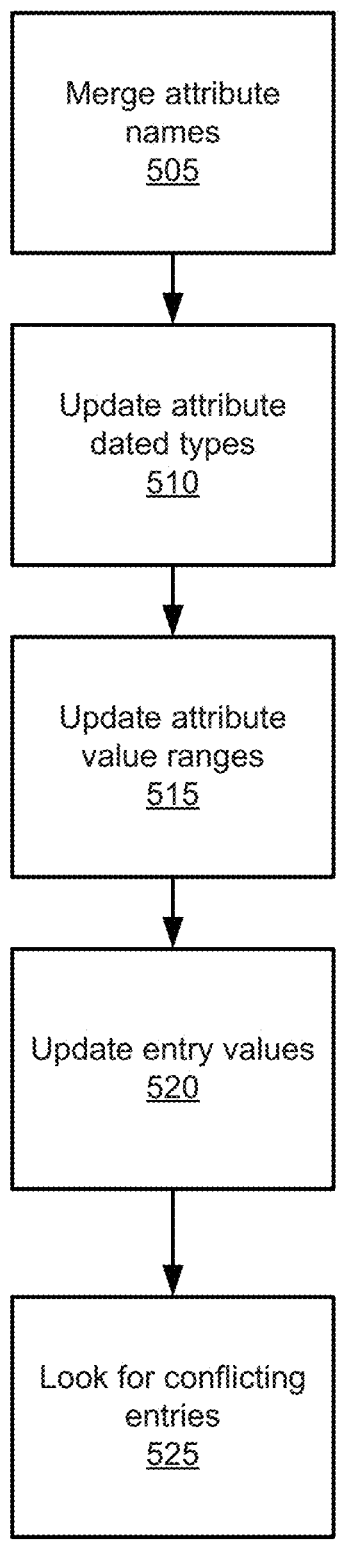
FIG. 5 is an exemplary screen shot that may be presented after processing ground truth data using certain embodiments of the information processing system.

FIG. 5 is a flowchart depicting operations that may be executed in one embodiment of the information processing system on the following exemplary data. In this example, a first SME has provided the following ground truth data in, for example, a csv file:

| Context | Attribute | Value |
| --- | --- | --- |
| Item 1 | costSquareFoot | $ 9.51 |
| Item 2 | costSquareFoot | $ 12.25 |
| Item 3 | squareFootCost | $ 10.94 |
| Item 4 | costSquareFoot | $12.80 (I think) |
| Item 5 | costSquareFoot | $905 |

A second SME, crowdsourcing, or optionally the output of a prior analysis in which ground truth data was updated may provide the following values:

| Context | Attribute | Value |
| --- | --- | --- |
| Item 1 | costSquareFoot | $9.50 |
| Item 2 | costSquareFoot | 12.25 |

In certain embodiments, the information processing system uses the ground truth data to build and store initial data structures for two attributes and seven entries:

Attributes:

```
{
Attribute Name: costSquareFoot
Data Type: string
Value Range: none
Acceptance Criteria: none
}
{
Attribute Name: squareFootCost
Data Type: currency
Value Range: none
Acceptance Criteria: none
}
```

The ground truth data identified above is then used to populate the initial data structures:

```
{
Attribute Name: costSquareFoot
Value: $9.51
Context: Item 1
}
{
Attribute Name: costSquareFoot
Value: $12.25
Context: Item 2
}
{
Attribute Name: squareFootCost
Value: $10.94
Context: Item 3
}
{
Attribute Name: costSquareFoot
Value: $12.80 (I think)
Context: Item 4
}
{
Attribute Name: costSquareFoot
Value: $905
Context: Item 5
}
{
Attribute Name: costSquareFoot
Value: $9.50
Context: Item 1
}
{
Attribute Name: costSquareFoot
Value: 12.25
Context: Item 2
}
```

In certain embodiments, the information processing system executes the operations shown in FIG. 5 on the foregoing data. At operation 505, the information processing system looks to merge attribute names. To this end, for each (attribute, attribute) pair, the information processing system calculates a confidence level based on attribute name difference and number of entries. At operation 510, the information processing system looks to update the attribute data types for each (attribute, data type) pair and calculates a confidence level based on the percent of actual entry values matching the data type. At operation 515, the information processing system looks to update attribute value ranges. To this end, in certain embodiments, the information processing system may suggest a value range for in attribute based on distribution/std dev of actual entry values, and calculate a confidence based on distribution/std dev percent of entries in the range. At operation 520, the information processing system looks to update entry values. In certain embodiments, if an entry value does not match attribute Data Type or Value Range, the information processing system creates a review-candidate to modify the value to fit Data Type and Value Range, and may calculate a confidence based on edit distance using, for example, string and numerical differences. At operation 525, the information processing may look for conflicting entries. In certain embodiments, for each conflicting entry, the information processing system may suggest expanding acceptance criteria or modifying one of the values and calculate confidence based on difference in acceptance criteria or values.

In certain embodiments, the foregoing operations as executed on the sample ground truth data results in the screen shot shown in FIG. 6. In this example, the information processing system presents a column 605 of quick fix suggestions for the review candidates. In an adjacent column 610, next to each quick fix suggestion, there is a list of reasons why the suggested quick fixes are applicable to the review candidates.

Although the present invention has been described in detail, it should be understood that various changes, substitutions and alterations can be made hereto without departing from the spirit and scope of the invention as defined by the appended claims.

What is claimed is:

1. A computer-implemented method for automated analysis of ground truth using an information processing system having a processor and a memory, the method comprising:
receiving, by the information processing system, ground truth data;
analyzing, by the information processing system, the ground truth data to identify review-candidates;
assigning, by the information processing system, a confidence level to each of the identified review-candidates;
prioritizing, by the information processing system, the review-candidates based at least on the assigned confidence levels;
electronically presenting, by the information processing system, the review-candidates in prioritized order to solicit corrective feedback for updating the ground truth data;
generating, by the information processing system, suggested fixes for the review-candidates; and
grouping identified review candidates having the same suggested fixes;
electronically presenting the grouped review-candidates in prioritized order along with the suggested fixes to solicit corrective feedback for updating the ground truth data using the suggested fixes; and,
training a question answer (QA) system using the suggested fixes.

2. The computer-implemented method of claim 1, wherein prioritizing the review-candidates further comprises:
prioritizing a review-candidate based on an impact of changing the review-candidate in the ground truth data using one or more of the respective suggested fixes.

3. The computer-implemented method of claim 2, wherein
the impact of changing the review-candidate in the ground truth data is based, at least in part, on a number of ground truth data entries that would be changed using the respective suggested fixes.

4. The computer-implemented method of claim 1, further comprising:
  identifying, by the information processing system, review-candidates based on similarities between different attribute names; and
  assigning, by the information processing system, a high confidence level to review-candidates having different attribute names within a predetermined edit distance.

5. The computer-implemented method of claim 1, further comprising:
  identifying, by the information processing system, review-candidates based on differences in data types in ground truth entries for a given attribute; and
  assigning, by the information processing system, a high confidence level to review-candidates having different data types for the given attribute.

6. A system comprising:
  a processor;
  a data bus coupled to the processor; and
  a non-transitory, computer-readable storage medium embodying computer program code, the non-transitory, computer-readable storage medium being coupled to the data bus, the computer program code interacting with a plurality of computer operations and comprising instructions executable by the processor and configured for:
  receiving ground truth data;
  analyzing the ground truth data to identify review-candidates;
  assigning a confidence level to each of the identified review-candidates;
  prioritizing the review-candidates based at least on the assigned confidence levels;
  electronically presenting the review-candidates in prioritized order to solicit corrective feedback for updating the ground truth data;
  generating, by the information processing system, suggested fixes for the review-candidates; and
  grouping identified review candidates having the same suggested fixes;
  electronically presenting the grouped review-candidates in prioritized order along with the suggested fixes to solicit corrective feedback for updating the ground truth data using the suggested fixes; and,
  training a question answer (QA) system using the suggested fixes.

7. The system of claim 6, wherein prioritizing the review-candidates further comprises:
  prioritizing a review-candidate based on an impact of changing the review-candidate in the ground truth data using one or more of the respective suggested fixes.

8. The system of claim 7, wherein:
  the impact of changing the review-candidate in the ground truth data is based, at least in part, on a number of ground truth data entries that would be changed using the respective suggested fixes.

9. The system of claim 6, wherein the instructions are further configured for:
  identifying review-candidates based on similarities between different attribute names; and
  assigning a high confidence level to review-candidates having different attribute names within a predetermined edit distance.

10. The system of claim 6, wherein the instructions are further configured for:
  identifying review-candidates based on differences in data types in ground truth entries for a given attribute; and
  assigning a high confidence level to review-candidates having different data types for the given attribute.

11. A non-transitory, computer-readable storage medium embodying computer program code, the computer program code comprising computer executable instructions configured for:
  receiving ground truth data;
  analyzing the ground truth data to identify review-candidates;
  assigning a confidence level to each of the identified review-candidates;
  prioritizing the review-candidates based at least on the assigned confidence levels;
  electronically presenting the review-candidates in prioritized order to solicit corrective feedback for updating the ground truth data;
  generating, by the information processing system, suggested fixes for the review-candidates; and
  grouping identified review candidates having the same suggested fixes;
  electronically presenting the grouped review-candidates in prioritized order along with the suggested fixes to solicit corrective feedback for updating the ground truth data using the suggested fixes; and,
  training a question answer (QA) system using the suggested fixes.

12. The non-transitory, computer-readable storage medium of claim 11, wherein prioritizing the review-candidates further comprises:
  prioritizing a review-candidate based on an impact of changing the review-candidate in the ground truth data using one or more of the respective suggested fixes.

13. The non-transitory, computer-readable storage medium of claim 12, wherein
  the impact of changing the review-candidate in the ground truth data is based, at least in part, on a number of ground truth data entries that would be changed using the respective suggested fixes.

14. The non-transitory, computer-readable storage medium of claim 11, wherein the instructions are further configured for:
  identifying review-candidates based on similarities between different attribute names; and
  assigning a high confidence level to review-candidates having different attribute names within a predetermined edit distance.

15. The non-transitory, computer-readable storage medium of claim 11, wherein the instructions are further configured for:
  identifying review-candidates based on differences in data types in ground truth entries for a given attribute; and
  assigning a high confidence level to review-candidates having different data types for the given attribute.

* * * * *